United States Patent
Kuo (10) Patent No.: US 8,457,033 B2
(45) Date of Patent: Jun. 4, 2013

(54) METHOD AND APPARATUS FOR HANDLING MBMS DYNAMIC SCHEDULING INFORMATION

(75) Inventor: Richard Lee-Chee Kuo, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 351 days.

(21) Appl. No.: 12/818,159

(22) Filed: Jun. 18, 2010

(65) Prior Publication Data

US 2010/0322133 A1 Dec. 23, 2010

Related U.S. Application Data

(60) Provisional application No. 61/218,425, filed on Jun. 19, 2009.

(51) Int. Cl.
*H04B 7/14* (2006.01)

(52) U.S. Cl.
USPC .......................................................... 370/315

(58) Field of Classification Search
USPC ............ 370/315, 389, 395.1, 395.4; 455/130, 455/334, 343.1, 343.2, 343.4; 379/201.01
See application file for complete search history.

(56) References Cited

U.S. PATENT DOCUMENTS

| | | | | |
|---|---|---|---|---|
| 8,169,957 | B2 * | 5/2012 | Damnjanovic | 370/329 |
| 2008/0186892 | A1 * | 8/2008 | Damnjanovic | 370/311 |
| 2009/0149164 | A1 * | 6/2009 | Cai | 455/414.2 |
| 2009/0274077 | A1 * | 11/2009 | Meylan et al. | 370/280 |
| 2010/0178895 | A1 * | 7/2010 | Maeda et al. | 455/404.1 |
| 2010/0190447 | A1 * | 7/2010 | Agrawal et al. | 455/63.1 |
| 2010/0272004 | A1 * | 10/2010 | Maeda et al. | 370/312 |
| 2010/0309835 | A1 * | 12/2010 | Kuo | 370/312 |
| 2010/0315987 | A1 * | 12/2010 | Kuo | 370/312 |
| 2010/0329171 | A1 * | 12/2010 | Kuo et al. | 370/312 |
| 2011/0034177 | A1 * | 2/2011 | Oh et al. | 455/450 |
| 2011/0038299 | A1 * | 2/2011 | Sugawara et al. | 370/312 |
| 2012/0044851 | A1 * | 2/2012 | Wang et al. | 370/312 |

FOREIGN PATENT DOCUMENTS

| | | |
|---|---|---|
| KR | 1020000059683 A | 10/2000 |
| WO | 2008151069 A1 | 12/2008 |

OTHER PUBLICATIONS

3GPP TSG-RAN2 Meeting #67 bis Miyazaki. Japan. Oct. 12-16, 2009 (R2-096259).
Office Action on corresponding foreign applicationn (KR 10-2010-0058270) from KIPO dated Sep. 26, 2011.
3GPP TS36.300 V8.8.0, "Overall description; Stage 2 (Release 8)", Mar. 2009.
3GPP Change Request R2-093533, "MBMS baseline for Rel-9", May 2009.
3GPP Change Request R2-093093, "MAC PDU design for eMBMS scheduling", May 2009.
3GPP R2-09xxxx, "E-mail discussion on eMBMS control plane details (66#19)", Jun. 2009.

(Continued)

*Primary Examiner* — Fan Ng
(74) *Attorney, Agent, or Firm* — Blue Capital Law Firm, P.C.

(57) ABSTRACT

A method for handling MBMS dynamic scheduling information in a network terminal of a wireless communication system is disclosed. The method includes steps of generating an MAC Control Element for carrying an MBMS dynamic scheduling information; and applying an MCCH specific Modulation and Coding Scheme (MCS) for transmitting the MAC Control Element on a corresponding Physical Multicast Channel (PMCH).

22 Claims, 5 Drawing Sheets

OTHER PUBLICATIONS

Huawei: "MBMS Dynamic Scheduling", 3GPP TSG-RAN WG2 Meeting #66, R2-092962, May, 4-8, 2009, XP050340756, San Francisco, USA.
3rd Generation Partnership Project; Technical Specification Group Radio Access Network; Evolved Universal Terrestrial Radio Access (E-UTRA) and Evolved Universal Terrestrial Radio Access Network (E-UTRAN) Overall description Stage 2 ( Release 9), 3GPP TS 36.300 V9.0.0 (Jun. 2009), front page+ pp. 2-157, XP050377586, Sophia Antipolis, France.

* cited by examiner

METHOD AND APPARATUS FOR HANDLING MBMS DYNAMIC SCHEDULING INFORMATION

CROSS REFERENCE TO RELATED APPLICATIONS

This application claims the benefit of U.S. Provisional Application No. 61/218,425, filed on Jun. 19, 2009 and entitled "Advanced MBMS reception of dynamic scheduling", the contents of which are incorporated herein by reference.

BACKGROUND OF THE INVENTION

1. Field of the Invention

The present invention relates to a method and apparatus for handling MBMS dynamic scheduling information, and more particularly, to a method and apparatus for determining the Modulation and Coding Scheme (MCS) of an MBMS dynamic scheduling information in a network terminal of a wireless communication system.

2. Description of the Prior Art

To enhance multimedia performance of the 3G mobile telecommunications system, the 3rd Generation Partnership Project (3GPP) introduces a Multimedia Broadcast Multicast Service (MBMS), which is a point-to-multipoint bearer service established on an existing network architecture of the Universal Mobile Telecommunications System (UMTS). MBMS allows a single source terminal to simultaneously transmit data to multiple user equipments (UEs) via Internet Protocol (IP) packets.

However, as the multimedia performance of mobile devices advances, consumers are more interested to have multimedia or mobile TV services via the mobile devices. In order to meet such requirement, the 3GPP introduces an enhanced MBMS (eMBMS) in a specification of long term evolution (LTE) Release-9, to support high quality streaming multimedia and real-time MBMS services.

The eMBMS introduces a single frequency network (SFN) operation for MBMS transmission, i.e. MBMS Single Frequency Network (MBSFN), to reduce service interruption due to frequency switching during transmissions. In MBSFN, single frequency is used by multiple cells to perform synchronized transmission at the same time, so as to save frequency resources and enhance spectrum utilization.

In addition, only two logical channels are defined in eMBMS to support point-to-multipoint (p-t-m) downlink transmission: Multicast Control Channel (MCCH) and Multicast Traffic Channel (MTCH). MCCH is utilized for transmitting control messages of all MBMS services in an MBSFN, and MTCH is utilized for transmitting session data of an MBMS service. Both MCCH and MTCH are mapped to a transmission channel newly defined by eMBMS, i.e. Multicast Channel (MCH).

For the current specifications, 3GPP change request R2-093533 is a stage 2 update for the MBMS functionalities. The following description about multi-cell transmission is quoted from this document:

(1) Synchronous transmission of MBMS is performed within an MBSFN Area.

(2) Combining of MBMS transmission from multiple cells is supported.

(3) A single transmission is used for MCH (i.e. neither blind HARQ repetitions nor RLC quick repeat);

(4) A single Transport Block is used per TTI for MCH transmission, and the TB uses all the MBSFN resources in the sub-frame.

(5) MTCH and MCCH can be multiplexed on the same MCH and are mapped on MCH for p-t-m transmission.

In general, an MBSFN has an MCCH. However, when an enhanced Node B (eNB) is simultaneously covered by multiple MBSFN areas, the eNB may have multiple MCCHs. Besides, since an MBSFN area can simultaneously support multiple MBMS services, and different MBMS services may have different requirements, such as Quality of Service (QoS), Block Error Rate (BLER), according to different characteristics, an MBSFN area may have multiple MCHs. Different MCHs suffice requirements of different MBMS services by applying different modulation and encoding schemes. MCCH is mainly responsible for providing these MCHs with the following control parameters:

(1) Modulation and Coding Scheme (MCS): illustrating encoding and modulation scheme of each MCH.

(2) MBMS service list: listing MBMS services currently provided by each MCH, and including MBMS service ID and session ID, and further including corresponding Logical channel ID (LCID) of MBMS services. Noticeably, MBMS service list only provides session information of MBMS services currently processed. In other words, once a session of one of the MBMS services is ended, a network terminal removes session information of the MBMS service from the MBMS service list, to notify a UE related to the MBMS service that the MBMS service session has been ended.

(3) MCH Sub-frame Allocation Pattern (MSAP): defining a pattern of sub-frames used by each MCH in a scheduling period. A set of these sub-frames used by one MCH is called an MSAP occasion. In each MSAP occasion, a network terminal can multiplex MCCH and MTCHs corresponding to different MBMS services on a Physical Multicast Channel (PMCH), which is a physical layer channel of MCH, for transmission.

Since an MCH may simultaneously provide multiple MBMS services, while an MBMS UE may be only interested in one of the services, the current specification further provides a Dynamic Scheduling Information (DSI) for an MCH, to indicate the sub-frames used by each MTCH in an MSAP occasion. The following principles are used for the Dynamic scheduling information:

(1) The dynamic scheduling information is used without considering whether multiple services are multiplexed onto an MCH to transmit or not.

(2) The dynamic scheduling information is generated by the eNB, and is transmitted at the beginning of each MSAP occasion, i.e. a first sub-frame.

(3) The dynamic scheduling information allows a UE to determine which sub-frames are used by each MTCH.

(4) How a dynamic scheduling information is carried is for further study, e.g. the dynamic scheduling information can be carried in a MAC Control Element or transmitted via a separate logical channel, such as a Multicast Scheduling Channel (MSCH).

(5) A mapping relation between an MTCH and corresponding sub-frames is determined according to indexes of sub-frames belonging to each MSAP occasion.

Under such a situation, 3GPP change request R2-093093 proposes to use an MBMS scheduling info MAC control element for carrying the dynamic scheduling information. In an MBMS scheduling info MAC control element, each MBMS service contains one ending point index (EPI) field for each MBMS service, for indicating an index of an ending sub-frame for each MBMS service in the current scheduling period.

In addition, except that different MCHs may apply different MCSs, 3GPP also proposed to have a logical channel specific MCS to support different QoS for each logical channel transmitted on the same MCH. For example, different MTCHs transmitted on the same MCH may have different MCSs, or MTCHs and MCCH transmitted on the same MCH may have different MCSs.

From the above, it is clear that the dynamic scheduling information may be transmitted together with the MCCH or an MTCH on an MCH/PMCH in the same sub-frame. Since the MCCH carries the MBMS service list and reception related information, e.g. the MTCH/PMCH configuration associated with each service, it is believed that the error rate requirement of MCCH is more critical than that of the dynamic scheduling information because a UE cannot perform reception of any MBMS service before successful reception of the MCCH. Thus, it is straightforward to apply the MCS of the MCCH for encoding or decoding the PMCH when the dynamic scheduling information is transmitted together with MCCH in the same sub-frame.

However, in the current specification, the MCCH is transmitted every MCCH repetition period, while the dynamic scheduling information is transmitted at the beginning of the MSAP occasion. Because the MCCH repetition period may be different from the period of an MSAP occasion, the dynamic scheduling information may be transmitted in a sub-frame without being accompanied by the MCCH. In this case, the dynamic scheduling information may be transmitted in a sub-frame together with the MTCH. AT the first glance, it seems the MCS of the present MTCH can be applied for transmitting the dynamic scheduling information in this case. But, before the dynamic scheduling information is received, a UE cannot know which MTCH is transmitted with the dynamic scheduling information. So it is infeasible.

Therefore, it is still not clear how to determine the MCS for receiving the dynamic scheduling information when the MCCH is not present in the same sub-frame. As a result, the dynamic scheduling information may not be received by the UE correctly.

SUMMARY OF THE INVENTION

It is therefore an objective of the present invention to provide a method and apparatus for handling MBMS dynamic scheduling information.

The present invention discloses a method for handling MBMS dynamic scheduling information in a network terminal of a wireless communication system. The method includes steps of generating an MAC Control Element for carrying an MBMS dynamic scheduling information; and applying a Multicast Control Channel (MCCH) specific Modulation and Coding Scheme (MCS) for transmitting the MAC Control Element on a corresponding Physical Multicast Channel (PMCH).

The present invention further discloses a communication device for handling MBMS dynamic scheduling information in a network terminal of a wireless communication system. The communication device includes a processor, for executing a program, and a memory, coupled to the processor, for storing the program. The program includes steps of generating an MAC Control Element for carrying an MBMS dynamic scheduling information; and applying a Multicast Control Channel (MCCH) specific Modulation and Coding Scheme (MCS) for transmitting the MAC Control Element on a corresponding Physical Multicast Channel (PMCH).

The present invention discloses a method for handling MBMS dynamic scheduling information in an user equipment (UE) of a wireless communication system. The method includes steps of applying a Multicast Control Channel (MCCH) specific Modulation and Coding Scheme (MCS) to receive a MAC control element carrying a MBMS dynamic scheduling information on a Physical Multicast Channel (PMCH) at the beginning of a scheduling period of a Multicast Channel (MCH); and receiving data of one or multiple Multicast Traffic Channels (MTCH) on the PMCH according to the MBMS dynamic scheduling information during the scheduling period.

The present invention further discloses a communication device for handling MBMS dynamic scheduling information in an user equipment (UE) of a wireless communication system. The communication device includes a processor, for executing a program, and a memory, coupled to the processor, for storing the program. The program includes steps of applying a Multicast Control Channel (MCCH) specific Modulation and Coding Scheme (MCS) to receive a MAC control element carrying a MBMS dynamic scheduling information on a Physical Multicast Channel (PMCH) at the beginning of a scheduling period of a Multicast Channel (MCH); and receiving data of one or multiple Multicast Traffic Channels (MTCH) on the PMCH according to the MBMS dynamic scheduling information during the scheduling period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
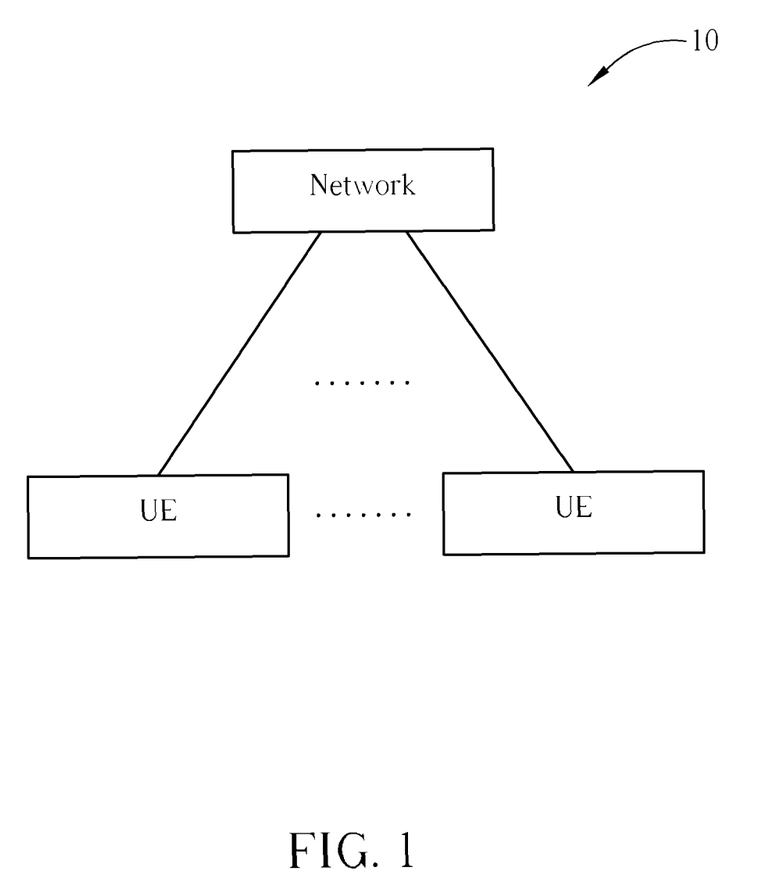
FIG. 1 is a schematic diagram of a wireless communications system.

Please refer to FIG. 1, which illustrates a schematic diagram of a wireless communications system 10. The wireless communications system 10 is preferred to be an LTE-advanced (LTE-A) system, and is briefly composed of a network and a plurality of user equipments (UEs). In FIG. 1, the network and the UEs are simply utilized for illustrating the structure of the wireless communications system 10. Practically, the network may comprise a plurality of base stations (Node Bs), radio network controllers and so on according to actual demands, and the UEs can be devices such as mobile phones, computer systems, etc.

Figure 2:
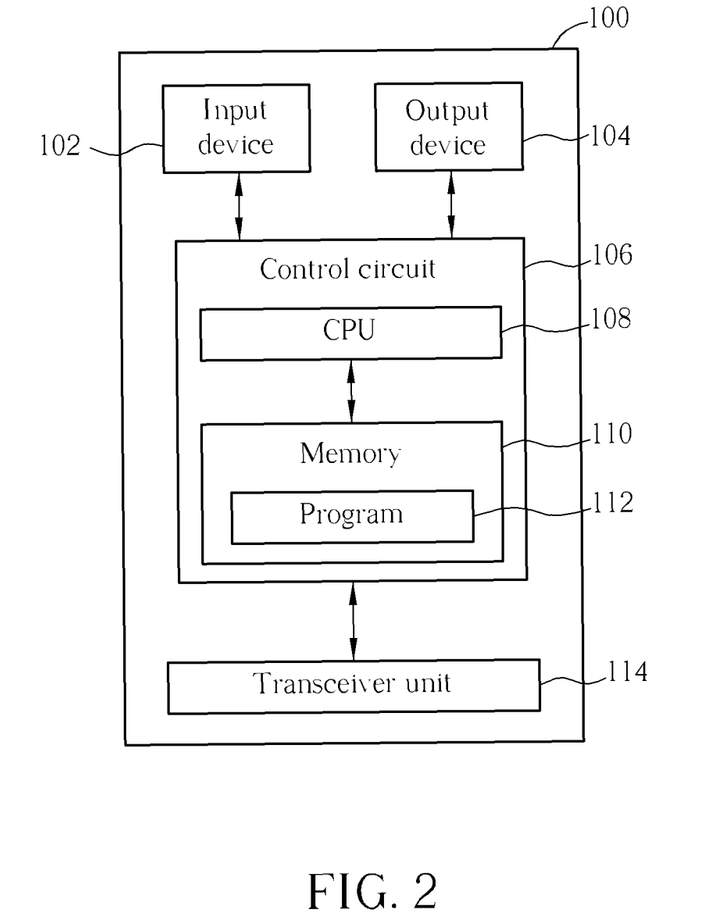
FIG. 2 is a function block diagram of a wireless communications device.

Please refer to FIG. 2, which is a functional block diagram of a communications device 100 in a wireless communications system. The communications device 100 can be utilized for realizing the UEs or the network in FIG. 1. For the sake of brevity, FIG. 2 only shows an input device 102, an output device 104, a control circuit 106, a central processing unit (CPU) 108, a memory 110, a program 112, and a transceiver unit 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver unit 114 is used to receive and transmit wireless signals, delivering received signals to the control circuit 106, and outputting signals generated by the control circuit 106 wirelessly. From a perspective of a communications protocol framework, the transceiver unit 114 can be seen as a portion of Layer 1, and the control circuit 106 can be utilized to realize functions of Layer 2 and Layer 3.

Figure 3:
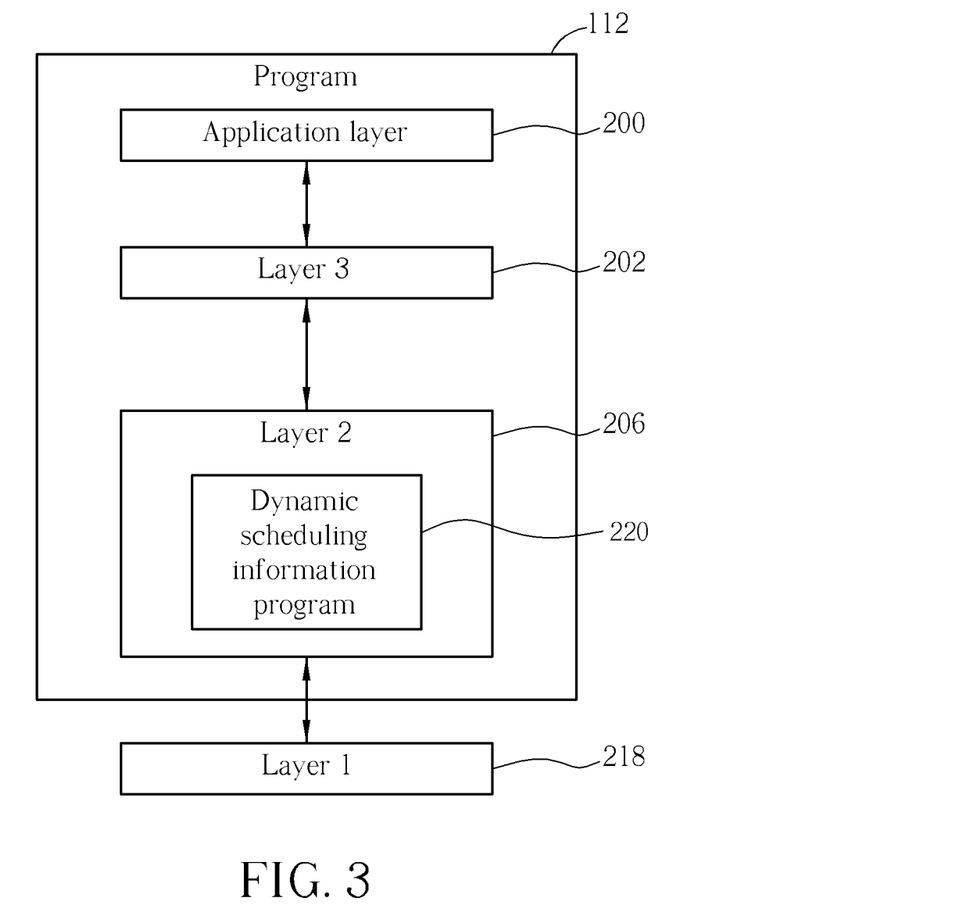
FIG. 3 is a schematic diagram of a program code of FIG. 2.

Please continue to refer to FIG. 3. FIG. 3 is a diagram of the program 112 shown in FIG. 2. The program 112 includes an application layer 200, a Layer 3 202, and a Layer 2 206, and is coupled to a Layer 1 218. The Layer 3 202 performs radio resource control. The Layer 2 206 comprises a Radio Link Control (RLC) layer and a Medium Access Control (MAC) layer, and performs link control. The Layer 1 218 performs physical connections.

The wireless communication system 10 can provide an enhanced MBMS (eMBMS), to support high quality streaming multimedia and real-time multicast and broadcast services. Only two logical channels are defined in eMBMS to support point-to-multipoint (p-t-m) downlink transmission: Multicast Control Channel (MCCH) and Multicast Traffic Channel (MTCH). MCCH is utilized for transmitting control messages of all MBMS services in an MBSFN, and MTCH is utilized for transmitting session data of an MBMS service. Both MCCH and MTCH are mapped to a transmission channel newly defined by eMBMS, i.e. Multicast Channel (MCH).

Since an MCH may simultaneously provide multiple MBMS services, while an MBMS UE may be only interested in one of the services, a Dynamic Scheduling Information (DSI) for an MCH is introduced, to indicate the sub-frames used by each MTCH in an MCH Sub-frame Allocation Pattern (MSAP) occasion. Besides, except that different MCHs may apply different MCSs, it is proposed to have a logical channel specific MCS to support different QoS for each logical channel transmitted on the same MCH. For example, different MTCHs transmitted on the same MCH may have different MCSs, or MTCHs and MCCH transmitted on the same MCH may have different MCSs.

Figure 4:
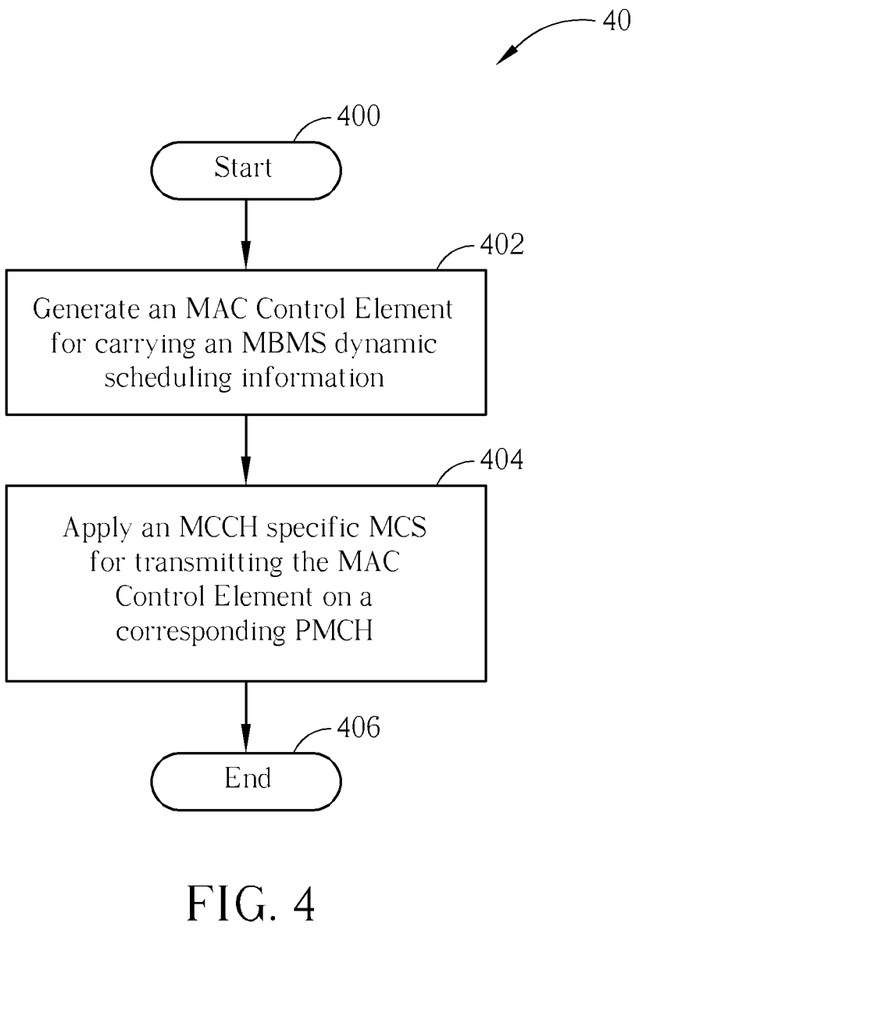
FIG. 4 is a schematic diagram of a process according to an embodiment of the present invention.

Under such a situation, the present invention provides a dynamic scheduling information program 220 in the program 112, for determining the MCS for transmitting the dynamic scheduling information, so as to enhance the MBMS performance. Please refer to FIG. 4, which is a schematic diagram of a process 40 according to an embodiment of the present invention. The process 40 is utilized for handling MBMS dynamic scheduling information in a network terminal of a wireless communication system, and can be compiled into the dynamic scheduling information program 220. The process 40 includes the following steps:

Step 400: Start.

Step 402: Generate an MAC Control Element for carrying an MBMS dynamic scheduling information.

Step 404: Apply an MCCH specific MCS for transmitting the MAC Control Element on a corresponding Physical Multicast Channel (PMCH).

Step 406: End.

According to the process 40, the network terminal first generates an MAC Control Element for carrying an MBMS dynamic scheduling information, i.e. an MBMS scheduling info MAC control element. Then, the network terminal applies an MCCH specific MCS for transmitting the MAC Control Element on a corresponding PMCH. The PMCH is corresponding to an Multicast Channel (MCH) in the MAC layer, for transmitting data multiplexed from the MCCH and multiple MTCHs; however, it is possible that the MCCH is transmitted on other PMCH.

In other words, no matter whether the dynamic scheduling information is transmitted together with MCCH in the same sub-frame, the network terminal according to the embodiment of the present invention applies the MCCH specific MCS to transmit the MAC control element which carries the dynamic scheduling information on the PMCH. As a result, the UE can use correct MCS to decode the PMCH for reception of the dynamic scheduling information.

As described in the prior art section, the dynamic scheduling information is used for indicating sub-frames used by each MTCH in a scheduling period of an MCH, and the scheduling period is the time duration of an MASP occasion. Besides, an MBMS scheduling info MAC control element is generally generated at the beginning of each scheduling period, i.e. at a first sub-frame of the scheduling period. As for detailed description of the dynamic scheduling information, please refer to the description in the prior art section, which is not narrated hereinafter.

Figure 5:
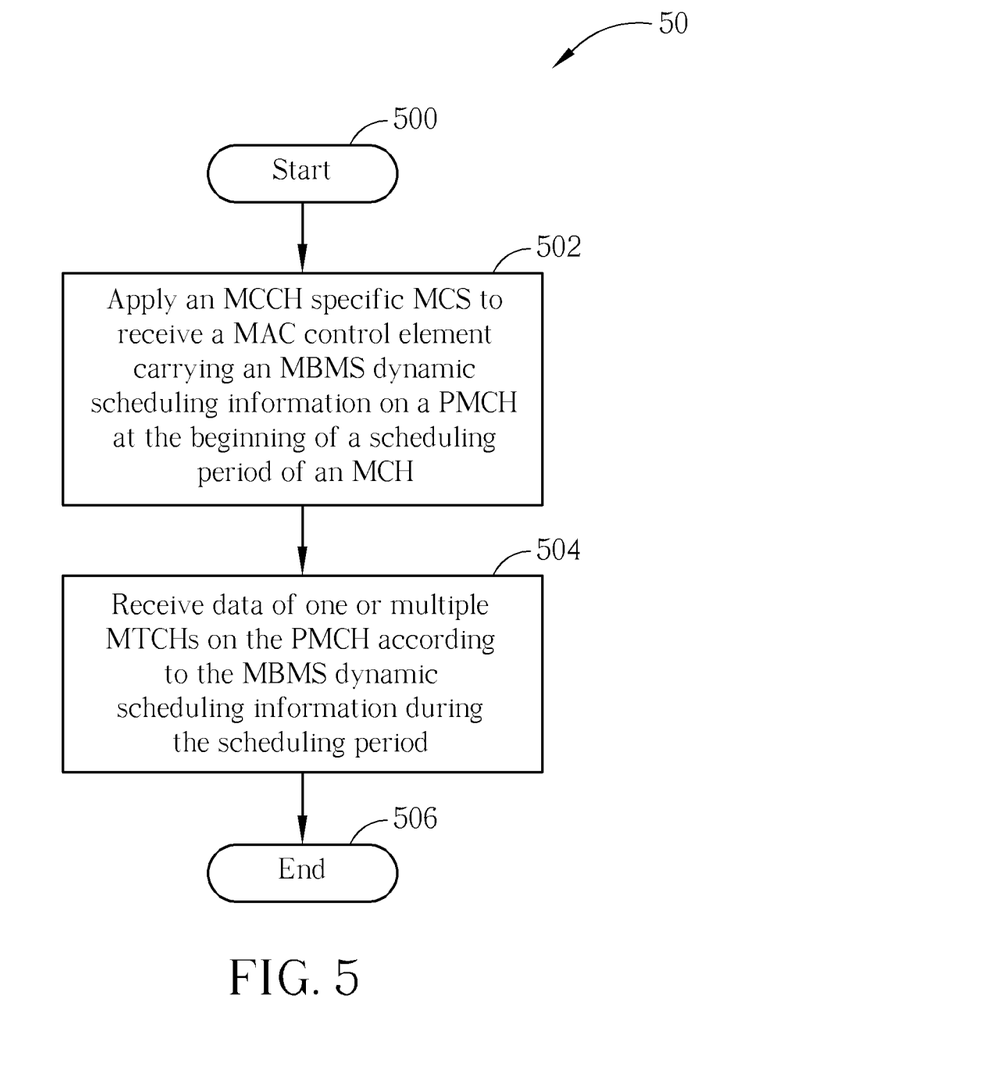
FIG. 5 is a schematic diagram of a process according to another embodiment of the present invention.

On the other hand, the embodiment of the present invention also provides related operations for the UE to handle the MBMS dynamic scheduling information, in order to have the behaviors between the network and the UE be coordinated. Please refer to FIG. 5, which is a schematic diagram of a process 50 according to an embodiment of the present invention. The process 50 is utilized for handling MBMS dynamic scheduling information in a UE of a wireless communication system, and can be compiled into the dynamic scheduling information program 220 as well. The process 50 includes the following steps:

Step 500: Start.

Step 502: Apply an MCCH specific MCS to receive a MAC control element carrying an MBMS dynamic scheduling information on a PMCH at the beginning of a scheduling period of an MCH.

Step 504: Receive data of one or multiple MTCHs on the PMCH according to the MBMS dynamic scheduling information during the scheduling period.

Step 506: End.

According to the process 50, at the beginning of the scheduling period (i.e. the first sub-frame of the scheduling period), the UE applies an MCCH specific MCS to receive a MAC control element carrying an MBMS dynamic scheduling information (i.e. an MBMS scheduling info MAC control element) on a PMCH. Then, during the scheduling period, the UE receives data of one or multiple MTCHs on the PMCH according to the MBMS dynamic scheduling information.

Thus, no matter whether the dynamic scheduling information is transmitted together with the MCCH in the same sub-frame, the UE always applies the MCCH specific MCS to receive the MAC control element which carries the dynamic scheduling information on the PMCH. As a result, the UE can correctly decode the PMCH for receiving the dynamic scheduling information, so as to receive data of multiple MTCHs on the PMCH according to the received dynamic scheduling information.

In summary, the embodiment of the present invention provides a method for handing MBMS dynamic scheduling information, for determining the MCS used to transmit the MBMS dynamic scheduling information, such that the UE can correctly perform the MBMS reception.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling MBMS dynamic scheduling information in a network terminal of a wireless communication system, the method comprising:
generating an MAC Control Element for carrying an MBMS dynamic scheduling information, wherein the MBMS dynamic scheduling information is used for indicating sub-frames used by each Multicast Traffic Channel (MTCH) in a scheduling period of a Multicast Channel (MCH); and
applying a Multicast Control Channel (MCCH) specific Modulation and Coding Scheme (MCS) for transmitting the MAC Control Element on a corresponding Physical Multicast Channel (PMCH),
wherein multiple MTCHs are multiplexed on the PMCH for transmission, while the MCCH is transmitted on the PMCH or other PMCHs.

2. The method of claim 1, wherein the scheduling period is a period that the network terminal generates one MAC control element for carrying an MBMS dynamic scheduling information.

3. The method of claim 1, wherein the MCCH and the each MTCH belong to the same MBMS Single Frequency Network (MBSFN) Area.

4. The method of claim 1, wherein the MCS is transmitted to an UE of the wireless communication system via a Broadcast Control Channel (BCCH), and the network terminal applies the MCS to transmit data on the MCCH.

5. A communication device for handling MBMS dynamic scheduling information in a network terminal of a wireless communication system, the communication device comprising:
a processor, for executing a program; and
a memory, coupled to the processor, for storing the program, wherein the program Comprises:
generating an MAC Control Element for carrying an MIMS dynamic scheduling information, wherein the MBMS dynamic scheduling information is used for indicating sub-frames used by each Multicast Traffic Channel (MTCH) in a scheduling period of a Multicast Channel (MCH); and
applying a Multicast Control Channel (MCCH) specific Modulation and Coding Scheme (MCS) for transmitting the MAC Control Element on a corresponding Physical Multicast Channel (PMCH),
wherein multiple MTCHs are multiplexed on the PMCH for transmission, while the MCCH is transmitted on the PMCH or other PMCHs.

6. The communication device of claim 5, wherein scheduling period is a period that the network terminal generates one MAC control element for carrying an MBMS dynamic scheduling information.

7. The communication device of claim 5, wherein the MCCH and the each MTCH belong to the same MBMS Single Frequency Network (MBSFN) Area.

8. The communication device of claim 5, wherein the MCS is transmitted to an UE of the wireless communication system via a Broadcast Control Channel (BCCH), and the network terminal applies the MCS to transmit data on the MCCH.

9. A method for handling MBMS dynamic scheduling information in an user equipment (UE) of a wireless communication system, the method comprising:
applying a Multicast Control Channel (MCCH) specific Modulation and Coding Scheme (MCS) to receive a MAC control element carrying a MBMS dynamic scheduling information on a Physical Multicast Channel (PMCH) at the beginning of a scheduling period of a Multicast Channel (MCH); and
receiving, data of one or multiple Multicast Traffic Channels (MTCH) on the PMCH according to the MBMS dynamic scheduling information during the scheduling period.

10. The method of claim 9, wherein the MBMS dynamic scheduling information is used for indicating sub-frames used by each MTCH in the scheduling period.

11. The method of claim 10, wherein the scheduling period is a period that the UE receives one MAC control element carrying an MBMS dynamic scheduling information.

12. The method of claim 9, wherein the beginning of the scheduling period means a first sub-frame of the scheduling period.

13. The method of claim 9, wherein the UE also applies the MCS to receive data on the MCCH.

14. The method of claim 9, wherein the MCS is received by the UE via a Broadcast Control Channel (BCCH).

15. The method of claim 9, wherein the MCCH and the one or multiple MTCHs belong to the same MBMS Single Frequency Network (MBSFN) Area.

16. A communication device for handling MBMS dynamic scheduling information in an user equipment (UE) of a wireless communication system, the communication device comprising:
a processor, for executing a program; and
a memory, coupled to the processor, for storing the program, wherein the program comprises;
applying a Multicast Control Channel (MCCH) specific Modulation and Coding Scheme (MCS) to receive a MAC control element carrying a MBMS dynamic scheduling information on a Physical Multicast Channel (PMCH) at the beginning of a scheduling period of a Multicast Channel (MCH); and
receiving data of one or multiple Multicast Traffic Channels (MTCH) on the PMCH according to the MBMS dynamic scheduling information during the scheduling period.

17. The communication device of claim 16, wherein the MBMS dynamic scheduling information is used for indicating sub-frames used by each MTCH in the scheduling period.

18. The communication device of claim 17, wherein the scheduling period is a period that the UE receives one MAC control element carrying an MBMS dynamic scheduling information.

19. The communication device of claim 16, wherein the beginning of the scheduling period means a first sub-frame of the scheduling period.

20. The communication device of claim 16, wherein the UE also applies the MCS to receive data on the MCCH.

21. The communication device of claim 16, wherein the MCS is received by the UE via a Broadcast Control Channel (BCCH).

22. The communication device of claim 16, wherein the MCCH and the one or multiple MTCHs belong to the same MBMS Single Frequency Network (MBSFN) Area.

* * * * *